United States Patent [19]
Stamatakis et al.

[11] Patent Number: 5,088,518
[45] Date of Patent: Feb. 18, 1992

[54] STEAM RESTRICTER DEVICE

[75] Inventors: E. M. Stamatakis; Robert B. Nicholson, both of St. Louis, Mo.

[73] Assignee: Steam Tech, Inc., St. Louis, Mo.

[21] Appl. No.: 662,465

[22] Filed: Feb. 28, 1991

[51] Int. Cl.$^5$ ................................................ F16T 1/34
[52] U.S. Cl. .................................... 137/171; 137/549; 138/44
[58] Field of Search ................ 137/183, 171, 549; 138/41, 44

[56] References Cited

U.S. PATENT DOCUMENTS

| | | | |
|---|---|---|---|
| 3,776,254 | 12/1973 | Alesson | 137/183 |
| 4,171,209 | 10/1979 | Brown | 55/466 |
| 4,426,213 | 1/1984 | Stavropoulos | 55/466 |
| 4,592,381 | 6/1986 | Troy | 137/183 |
| 4,745,943 | 5/1988 | Mortenson | 137/177 |

OTHER PUBLICATIONS

Title: The Steamgard System; Author: Engineering Resources, Inc.; Date: Nov., 1984; pp.: All.
Title: Steambloc TM Radiator Inserts; Author: CRS Steam, Inc.,; Date: Jun. 28, 1989; pp., All.
Title: Proceedings of 9th World Energy Eng'g. Congress; Author: F. Dickman; Date: Oct., 1986; pp.: 473-479.

Primary Examiner—Alan Cohan
Attorney, Agent, or Firm—Senniger, Powers, Leavitt & Roedel

[57] ABSTRACT

A steam restricter device of the present invention is designed for retrofit to an existing steam trap of the type including a bowl-shaped chamber-defining member having an opening in it for admitting steam and condensate, and a drain for passage of condensate from the chamber to a condensate return. The device includes a body having an upper portion and a lower portion of smaller outer diameter than the upper portion. The lower portion may be slidingly received in the drain without rotation. The body has a nozzle formed in it which is sized to permit passage of condensate, but to inhibit passage of steam. The upper portion has an intake in it which provides communication from the chamber to the nozzle, and the lower portion has an opening in it which provides communication from the nozzle to the condensate return. A generally tubular bushing fits around the lower portion of the body and sealingly engages a wall in the drain for sealing between the lower portion and the wall of the drainage opening. A filter cage is located by engagement with the body, upon assembly therewith, in a position in which all communication from the chamber to said opening in the upper portion is blocked except through the filter cage.

17 Claims, 3 Drawing Sheets

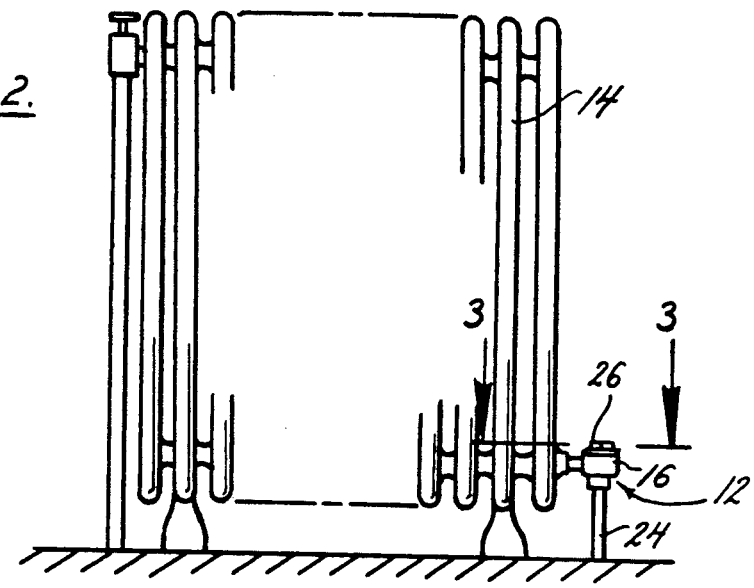
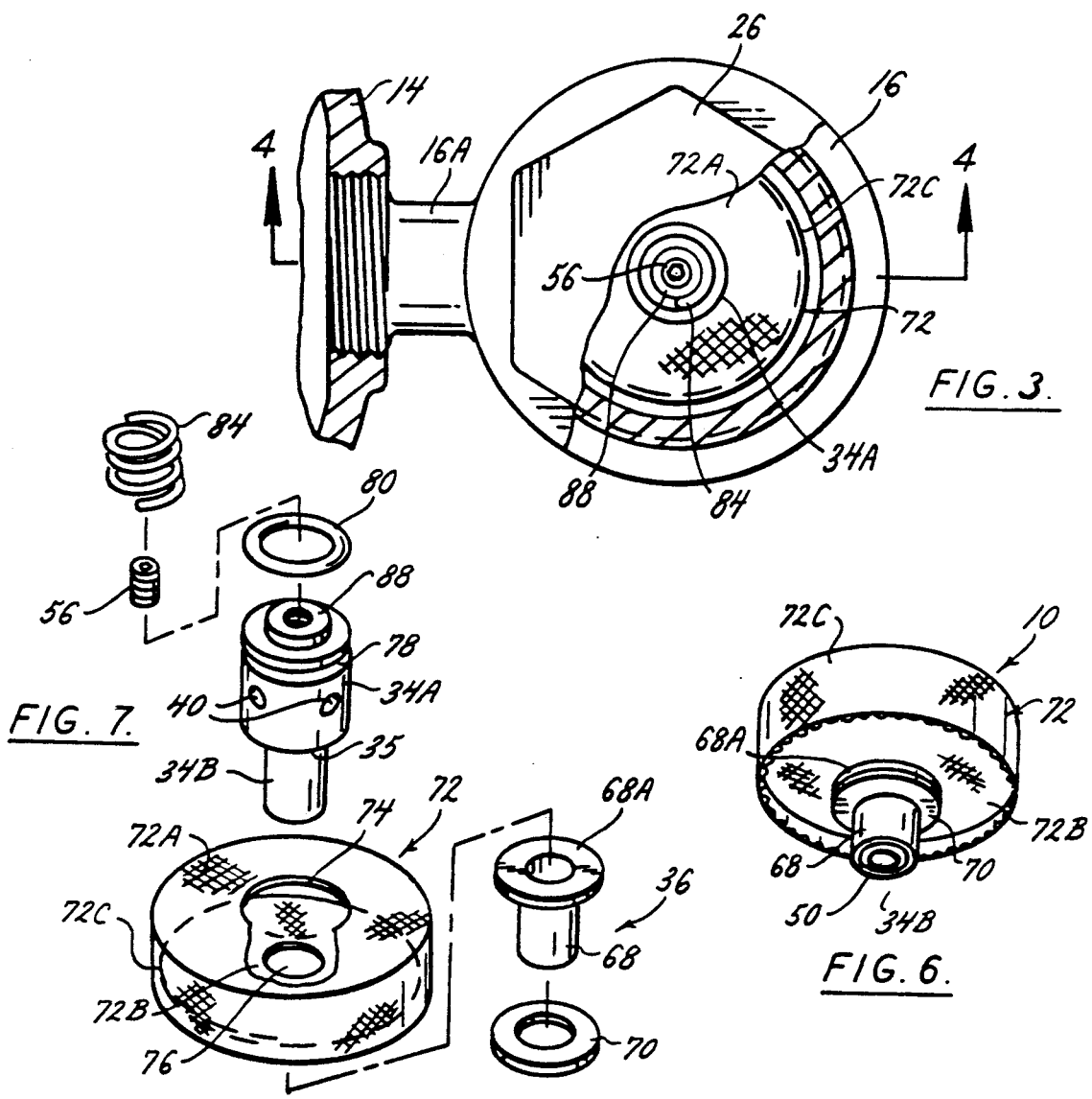

STEAM RESTRICTER DEVICE

BACKGROUND OF THE INVENTION

This invention relates generally to traps for removal of condensate from a steam/condensate mixture in a steam system for return to a boiler, and more specifically to a steam restricter device which may be retrofitted to existing steam trap structure.

Presently, there are many closed steam systems, for instance steam heating systems, which relay upon steam traps designed around the turn of the century for removal of condensate from the steam. These steam traps are inefficient and have moving parts making them subject to frequent failure, which causes substantial losses of steam and increases costs for maintenance and replacement of these devices. One type of steam trap with moving parts commonly used on steam heat radiators is a bellows steam trap including a bowl shaped trap into which steam is fed and from which condensate is discharged through an opening in the bottom of the trap to the boiler. The bellows is made of heat expansible material and suspended from a cover on the top of the trap. The bellows expands to plug the opening to prevent the escape of steam when the trap is full of steam and thus at a relatively high temperature. The bellows contracts when the trap temperature falls (corresponding to the presence of significant amounts of condensate), allowing condensate to escape through the opening to the condensate return.

More efficient and reliable systems have been developed which employ a constricted orifice design exploiting the properties of two-phase flow in saturated steam. More specifically, an orifice is placed at the inlet to the condensate return line which is sized according to the particular operating characteristics (e.g., pressure and temperature) of the system so that condensate will flow through the orifice, but at such a rate and volume so as to substantially block the orifice to the flow of steam, thus restraining the steam in the system. Reference is made to U.S. Pat. No. 4,171,209 (Brown) which shows a such a steam trap employing the principles of the constricted orifice. Greater efficiencies in the removal of condensate with minimal steam loss have been achieved through the employment of modified Venturi nozzles, such as is shown in U.S. Pat. No. 4,171,209.

However, the existence of efficient, reliable orifice-type steam restricter devices for removing condensate is of little consolation to owners of older steam systems having old style steam traps who are faced with significant capital expenditures in order to remove the old steam traps and replace them with the new traps. Moreover, such constricted orifice devices have required frequent cleaning to avoid clogging from debris in the system. Thus, there is presently a need for an inexpensive, relatively steam restricter device which may be easily retrofitted to existing steam trap structure, and easily maintained thereafter.

SUMMARY OF THE INVENTION

Among the several objects of the present invention may be noted the provision of a steam restricter device which removes condensate from a steam circuit with minimal loss of steam; the provision of such a device which may be easily retrofitted to an existing steam trap; the provision of such a device which can operate for long periods of time without becoming clogged with debris; the provision of such a device which can be easily removed for cleaning and then replaced without the use of tools; the provision of such a device which is sturdy in construction, simple in design and inexpensive to manufacture.

Further among the several objects of the present invention may be noted the provision of a method for retrofitting a steam restricter device in an existing steam trap.

Still further among the several objects of the present invention may be noted the provision of a steam restricter kit which allows the steam restricter to be retrofitted in steam trap structures of different internal dimensions.

A steam restricter device of the present invention is constructed for retrofitting in an existing steam trap including a chamber-defining member having an inlet therein for admitting steam and condensate into the chamber and a drain for passage of condensate from the chamber to a condensate return. IN general, the device comprises a body including an upper portion with an intake therein and a lower portion with an outlet therein, which is adapted for reception in the drain. A passage extending through the body from the intake to the outlet includes a nozzle configured to permit passage of condensate but to inhibit passage of steam. Sealing means on the lower portion of the body makes a threadless, friction-fit seal with the drain when the lower portion is inserted into the drain, such that substantially all communication from the chamber to the condensate return is blocked expect through the nozzle. Filter means encloses the intake to prevent the nozzle from becoming clogged with debris.

Other objects and features of the present invention will in part apparent and in part pointed out hereinafter.

BRIEF DESCRIPTION OF THE DRAWINGS

FIG. 2 is an elevation of a radiator of the type used in a steam heating system including a non-orifice type steam trap;

FIG. 3 is a plan view of the steam trap of FIG. 2 with parts broken away to reveal a steam restricter device of the present invention retrofitted therein;

FIG. 6 is a perspective of the steam restricter device;

FIG. 7 is an exploded perspective view of a restricter device of the present invention.

Corresponding reference characters indicate corresponding parts throughout the several views of the drawings.

DETAILED DESCRIPTION OF THE PREFERRED EMBODIMENTS

Figure 4:
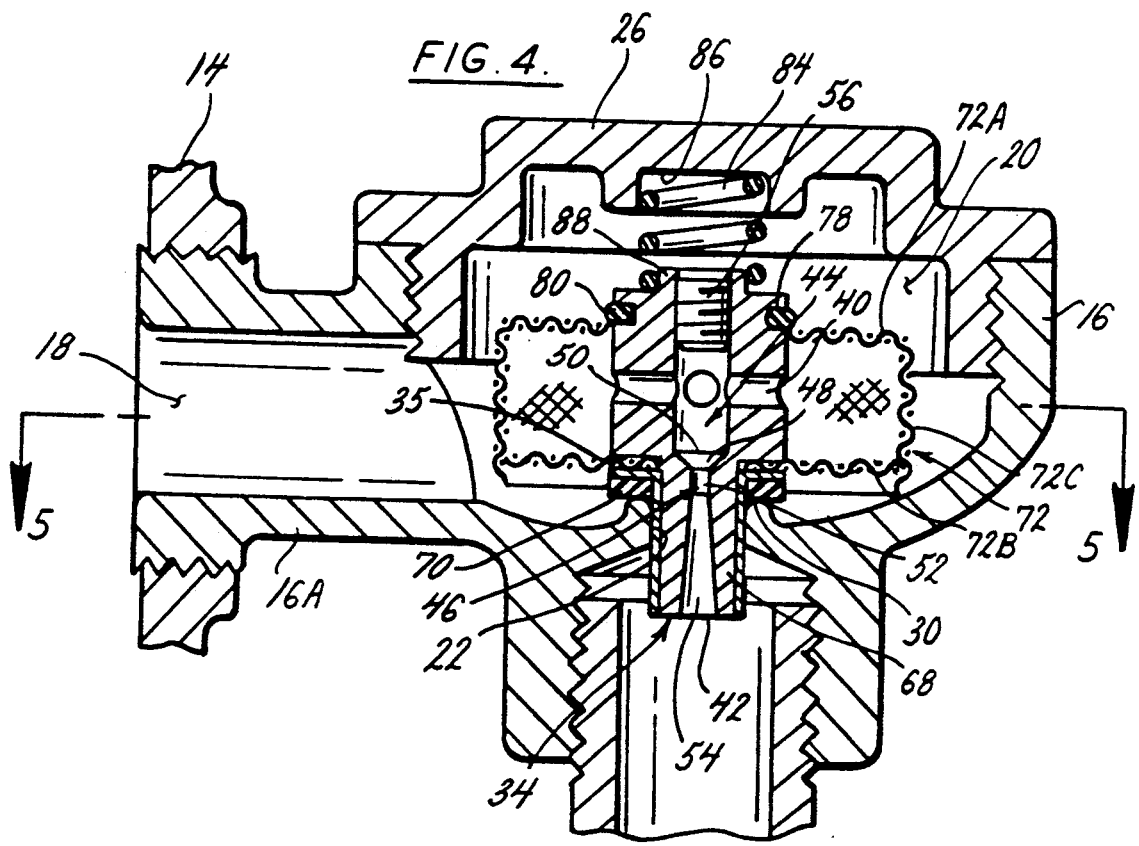
FIG. 4 is section taken in the plane including line 4—4 of FIG. 3.

Referring now to the drawings, a steam restricter device of the present invention, indicated generally at 10, is constructed so as to be easily retrofitted in existing steam traps such as a steam trap 12 of a steam heat radiator 14 (FIG. 2). It is to be understood that the present invention may also be used for recovery of condensate in closed steam circuits other than steam heating systems. As shown in FIG. 4, the steam trap 12 includes a bowl-shaped, chamber-defining member 16 including a portion 16A extending outwardly from it which is connected to the radiator 14 and defines an inlet 18 for admitting steam and condensate into a chamber 20. A drain 22 at the bottom of the chamber-defining member 16 provides for passage of condensate from the chamber to a condensate return 24 attached to the bottom of the chamber-defining member which returns the condensate to the boiler (not shown), completing its circuit. A removable cover 26, which forms a part of the chamber-defining member 16 is threadably attached to the remaining portions of the chamber-defining member.

Figure 1:
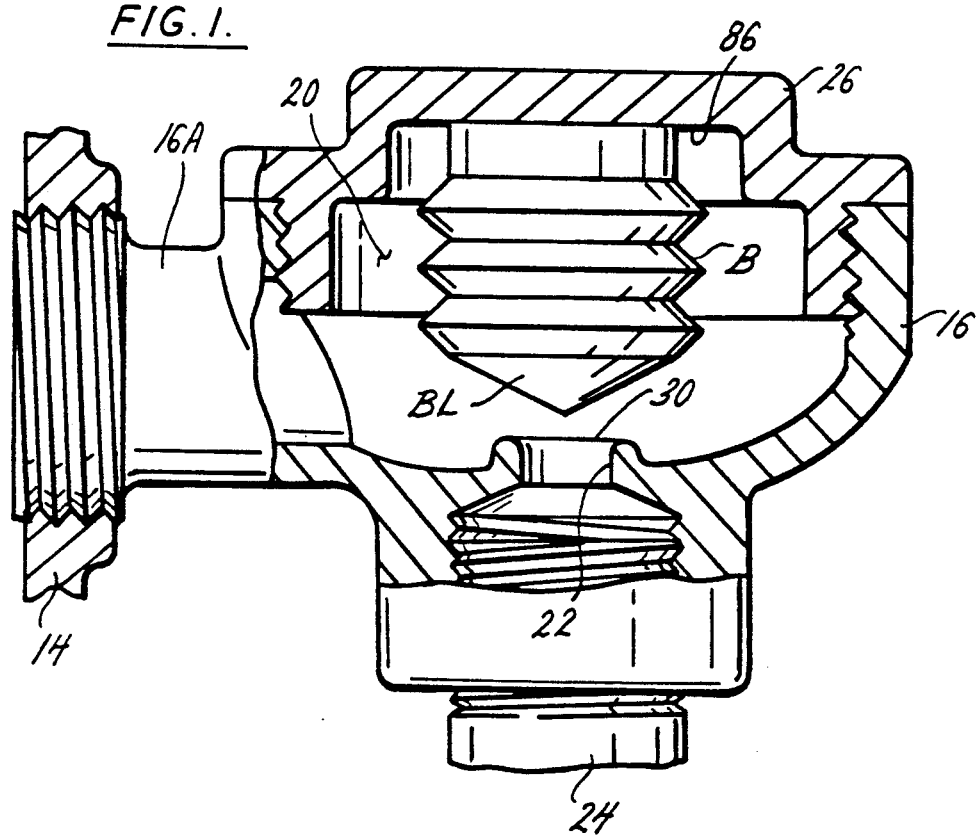
FIG. 1 is an elevation of a steam trap with parts broken away to show its internal configuration prior to being refitted with a steam restricter device of the present invention.

A steam trap 12 of the type described would have originally been equipped with a temperature sensitive stop member which moved to block the drain 22 when the chamber 20 was filled (primarily) with stem and to open the drain when a sufficient amount of condensate was present in the chamber. As shown in FIG. 1, one such mechanism is a bellows device B made of a heat sensitive material which depends from the cover 26. The presence of a large proportion of steam in the chamber 20 corresponds to a relatively high temperature, causing the bellows device B to expand. The lower end BL of the bellows device engages a seat 30 surrounding the drain 22 at the bottom of the chamber-defining member 16 and blocks the drain. A drop in temperature in the chamber 20 corresponds to the accumulation of condensate. The temperature drop causes the bellows device B to contract, withdrawing its lower end BL from the drain 22. Condensate as well as steam may now flow down the drain 22 into the condensate return 24. The stem restricter device 10 of the present invention is adapted to replace a condensate removal mechanism, such as the bellows device B, which has moving parts subject to frequent failure, without requiring substantial modification to the existing steam trap 12.

Referring now to FIG. 7, the primary components of the steam restricter device 10 of the present invention are shown to include a body 34 having an upper portion 34A and a lower portion 34B of smaller outer diameter than the upper portion. A shoulder 35 is defined at the juncture of the upper portion 34A and lower portion 34B. the body 34 is preferably made of stainless steel so that it will resist corrosion in the oxidizing atmosphere in the chamber 20. The lower portion 34B is sized for sliding reception in the drain 22 of the steam trap 12, as shown in FIG. 4. The diameter of the lower portion 34B is such that it will be received in the majority of drains found in various steam trap structures of the same general type as the chamber-defining member 16. Other means 36, described in more detail hereinafter, is provided for adapting the lower portion 34B to a particular size drain 22.

As shown in FIG. 4, the body 34 has an intake 40, defined by four radially outwardly opening passageways in the upper portion 34A of the body, and an outlet 42 in the lower portion 34B. A passage, indicated generally at 44, formed in the body 34 extends generally longitudinally of the body and connects the intake 40 with the outlet 42. The passage 44 includes a nozzle, indicted generally at 46, which is configured to permit passage of condensate but to inhibit passage of steam; thus operating to restrain steam in the chamber 20 (and radiator 14). the nozzle 46 includes a first section 48 generally at an inlet end 50 of the nozzle, a second section 52 adjacent the first section, and a third section 54 adjacent the second section 46 and located generally adjacent the outlet 42. The first section 48 has a cross sectional diameter which decreases as it extends from the inlet end 50 toward the second section 52 of the nozzle 46. The second section 52 has a generally constant diameter which is sufficiently small to substantially inhibit the passage of steam while allowing passage of condensate. The third section 54 is longer than the second section 52 and has a cross sectional diameter which continuously increases from the second section until its termination at the outlet 42. A ratio of the cross sectional diameter of the third section at the outlet 42 to the cross sectional diameter of the second section is approximately 1.5 has been found to produce good results (i.e., preventing the passage of steam while encouraging passage of condensate) in most residential and commercial steam heating systems. The first section 48 of the nozzle at the inlet end 50 opens into the passage 44. A headless bolt 56 is adapted to be threadably received in the upper end of the body 34 to seal the passage 54 from communication with the chamber 20 through the upper end of the body.

The sealing means 36 is provided for sealing the lower portion 34B of the body 34 in the drain 22 so that all communication from the chamber 20 to the condensate return 24 is blocked except through the nozzle 46. The sealing means 36 includes a generally tubular bushing 68 made of stainless steel and an annular gasket 70 made of elastomer material. The annular gasket 70 may be fitted over the lower portion 34B of the body generally against the bottom end of the upper portion 34A. Thus, when the restricter device 10 is inserted into the drain 22, the gasket engages the seat 30 surrounding the drain opening to seal the body 34 with the chamber-defining member 16. For applications in which the diameter of the drain 22 is substantially larger than the outside diameter of the lower portion 34B of the body, the busing 68 may be fitted over the lower portion 34B of the body. The bushing 68 is of sufficient diameter so that upon insertion of the lower portion into the drain 22, the bushing engages a wall in the drain to hold the body 34 in the drain and provide at least a partial seal between lower portion 34B and the wall of the drain. The bushing 68 includes a radially outwardly projecting flange 68A at its upper end which is adapted to engage the seat 30 surrounding the drain 22 to further seal the lower portion 34B in the drain. When the bushing 68 is employed, the annular gasket 70 fits around the bushing, as illustrated in FIGS. 6 and 7. Thus it may be seen that the steam restricter device 10 of the present invention is uniquely adapted for retrofitting to the existing steam trap 12.

Filter means, comprising in this embodiment a filter cage indicated generally at 72, is adapted to be removably assembled with the body 34. The filter cage is located intermediate the top and bottom ends of the body 34, and encloses the intake 40. The filter cage 72 is made of a corrosion resistant metal wire mesh and will pass steam and condensate, but strain out debris (e.g., small fragments of pipe) carried along by the flow of steam which might otherwise clog the nozzle 46, making the steam restricter device 10 inoperable. The filter cage 72 includes a generally circular upper wall 72A, a generally circular lower wall 72B spaced apart from the upper wall, and a tubular side wall 72C extending between the peripheral margins of the upper and lower walls. The side wall 72C has a diameter substantially greater than the diameter of the upper portion 34A of the body, such that, when assembled with the body 34, the filter cage 72 extends radially outwardly from the upper portion. The filter cage 72 thus has a relatively large amount of surface area in comparison to the surface area of the upper portion 34A, which increases the time the filter cage may strain debris before it becomes choked with debris and requires cleaning.

The upper wall 72A of the filter cage 72 has a centrally located opening 74 in it which is large enough to receive the upper portion 34A of the body 34 through it. The lower wall 72B has a centrally located opening 76 which is smaller than the upper portion 34A but large enough to receive the lower portion 34B. to assemble the restricter device 10 from its component parts, as shown in FIG. 7, the filter cage 72 is slid over the body 34 from its bottom end with the lower portion 34B first passing through the opening 74 in the upper wall 72A and then the opening 76 in the lower wall 72B. The upper portion 34A of the body 34 is received in the opening 74 in the upper wall 72A, but the shoulder 35 engages the lower wall 72B generally around the opening 76 in the lower wall 72B, and locates the filter cage 72 on the body. The annular gasket 70, or, if needed the bushing 68 and then the annular gasket, would then be fitted onto the lower portion 34B of the body. The assembled device 10 (with the bushing 68) is shown in FIG. 6. The flange 68A of the busing engages the lower wall 72B of the filter cage 72 to clamp the lower wall of the filter cage between the flange and the upper portion 34A of the body (FIG. 4). After insertion of the lower portion 34B into the drain 22, the pressure of the engagement of the bushing flange 68A (or gasket 70) with the seat 30 is transmitted to the flange, filter cage 72 and upper portion 34A of the body so that the flange also operates to seal the lower wall 72B of the filter cage with the upper portion 34A of the body. For sealing the filter cage 72 with the body 34 at its upper wall 72A, a circumferentially extending groove 78 is formed in the upper portion 34A near the upper end of the body for holding an O-ring 80 (broadly a "sealing member") of elastomeric material. The O-ring 80 is positioned by the groove 78 so that when the filter cage 72 is clamped onto the body, the margins of the upper wall 72A surrounding the opening 74 engage the O-ring with sufficient force to form a seal with the O-ring. However, it is to be understood that the restricter device may lack the groove 78 and O-ring 80 for sealing the filter screen 72 with the upper portion 34A of the body, and still fall within the scope of the present invention. It has been found that for most applications, the engagement of the filter screen 72 with the upper portion 34A of the body forms a sufficient seal.

Means, constituting in this embodiment a coil compression spring 84, releasably secures the body 34 in the drain 22. The spring 84, when placed in the chamber 20 as shown in FIG. 4, engages the cover 26 (which defines an upper wall 86 of the chamber-defining member 16) and the upper portion 34A of the body. The spring 84 is held in compression between the wall 86 and the upper portion 34A and exerts a force against the body 34 for holding the lower portion 34B of the body in the drain 22. The spring's compressive force also aids in sealing the busing 68 with the lower wall 72B of the filter cage 72 and the body 34, as well as in the formation of a seal between the bushing 68, annular gasket 70 and the seat 30 surrounding the drain 22. The only portion of the filter cage 72 which supports the holding force is the portion of the lower wall 72B located between the upper portion 34A and the bushing flange 68A. Thus, it may be seen that the filter cage is protected from being damaged by the force applied to hold the body 34 in place. Alternatively, if only the annular gasket 70 is used without the bushing 68, the compressive force of the spring 84 facilitates sealing between the seat 30 and the body 34. The upper end of the body 34 has been rabbeted, leaving a centrally disposed, upwardly projecting portion 88 of the body which is received inside the lower end of the spring 84 for locating the spring on the body. Thus, the spring 84 may be quickly and yet securely applied to the body 34 to facilitate the quick retrofit of the steam restricter device 10 in the chamber 20.

The advantageous construction of the steam restricter device 10 is illustrated by the method in which the device may be retrofitted to an existing steam trap 12, such as the steam trap of the radiator 14 shown in FIG. 2. Prior to beginning the retrofitting operation, the particular steam system would be analyzed to determine the appropriate nozzle 46 size based upon the operational characteristics of that system. Of course, the operating characteristics of a steam heating system are generally standard so that customizing nozzles for such an application will usually be unnecessary. Other systems, operating at high temperatures, may require special nozzle dimensions. To begin retrofitting the steam restricter device 10, the cover 26 is unscrewed from the chamber-defining member 16 and removed to expose the chamber 20. The bellows device B, described above, which is connected to the underside of the cover 26, is removed from the cover. Either before or after removing the bellows device, the body 34 is inserted downwardly into the chamber 20 with the lower portion 34B of the body sliding without substantial rotation into the drain 22 in the chamber-defining member 16. The body 34 is not secured in the drain 22 by a threaded connection of the body and the chamber-defining member 16, therefore the body can be quickly slid into the drain 22 rather than screwed in. Insertion of the lower portion 34B into the drain 22 blocks communication from the chamber 20 to the condensate return 24 except through the steam restricter device 10.

As described above, means 36, namely the bushing 68 and the annular gasket 70, is provided to assure that the lower portion 34B is sealed in the drain 22. The outer diameter of the lower portion 34B is sized generally slightly smaller than the diameter of the ordinary drain 22 encountered in the particular type of steam system (e.g., a steam heating system) in which the steam restricter device 10 is to be placed. Thus, the lower portion 34B of the body may be easily slid into drains having a range of diameters. However, in order that the lower portion 34B be sealed in any particular drain, at least the annular gasket 70 should be applied to the lower portion. The gasket 70 engages portions of the chamber-defining member 16 surrounding the drain 22 and seals the restricter device 10 with the chamber defining member. In some instances, the bushing 68 must be fitted over the lower portion 34B of the body to properly seal the restricter device with the chamber-defining member 16. The bushing 68 is fitted onto the lower portion 34B after the annular gasket 70 such that the restricter device 10 is configured as shown in FIG. 6. The busing 68 is selected which has an outer diameter corresponding to (e.g., having a slightly larger diameter than) the diameter of the drain. This selection is made from a plurality of tubular bushings having inner diameters corresponding to the outer diameter of the lower portion 34B and outer diameters of different sizes. The selected bushing 68 is fitted around the lower portion 34B of the body. At that point, the restricter device 10 is ready for fitting into the chamber-defining member 16, as shown in FIG. 4.

In order to secure the body 34 in the drain 22, a coil spring 84 of the type described above is selected from a plurality of coil springs having different relaxed lengths. The selected spring 84 will have a relaxed length greater than the separation between the upper end of the body 34 and the upper wall 86 (as defined by the cover 26) of the chamber-defining member 16. The lower end of the spring 84 is fitted on the upwardly projecting portion 88 of the body 34 and the cover 26 is screwed back onto the remaining portions of the chamber-defining member 16. The spring 84 is then held in compression between the cover 26 and the upper end of the body 34 such that it exerts a force holding the lower portion 34B of the body in the drain 22.

Maintenance of the steam restricter device 10 consists of occasional cleaning of the filter cage 72 and nozzle 46. The restricter device 10 may be separated from the chamber-defining member 16 by simply removing the cover 26 and pulling the lower portion 34B of the body out of the drain 22 by hand. After removing the annular gasket 70 and the busing 68 from the lower portion 34B, the filter cage 72 may be slid off the body 34 and blown clean. The nozzle 46 may also be blown clean. The restricter device 10 is reassembled and replaced in the chamber 20 by following the same steps described above for the initial retrofit of the device 10 in to the chamber-defining member 16. Removal and replacement of the restricter device may be carried out without the use of any tools.

Figure 8:
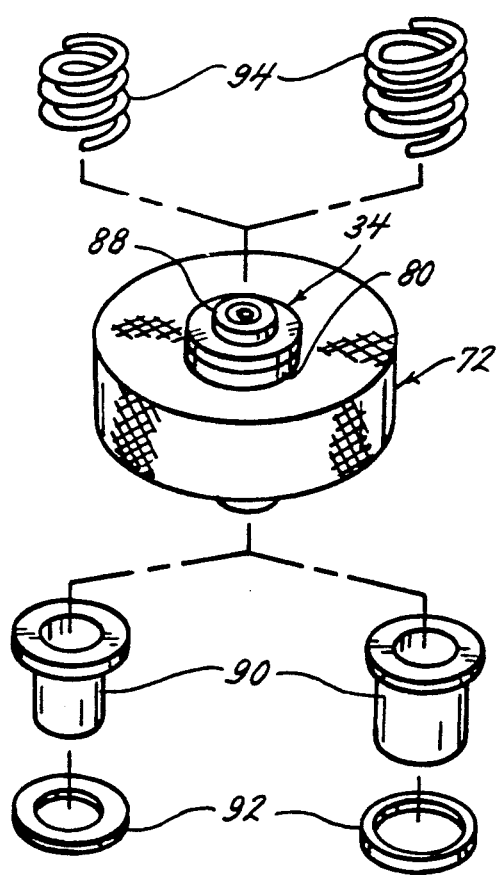
FIG. 8 is a perspective of a steam restricter device kit.
Figure 5:
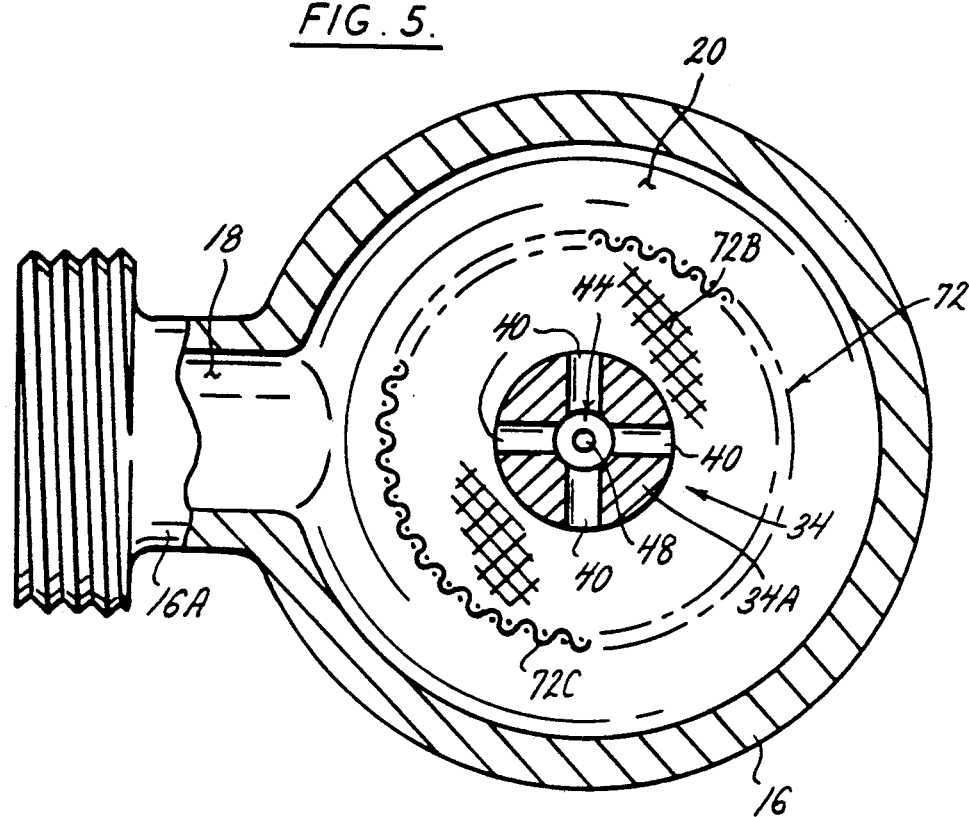
FIG. 5 is section taken in the plane including line 5—5 of FIG. 4.

A steam restricter device kit for retrofitting a orifice-type stream restricter device 10 in any one of a plurality of steam traps of the type described above is shown in FIG. 8 and includes the component parts of the steam restricter device 10 shown in FIG. 7. In addition, the kit includes a plurality of tubular bushings 90 (two are shown), each having the same general configuration as bushing 68, with their inner diameters corresponding to the outer diameter of the lower portion 34B, but having outer diameters of different sizes. A plurality of annular gasket 92 (two are shown) having internal diameters corresponding to the different outer diameters of the bushings, are also provided. Using the kit of the present invention, the retrofit of the restricter device 10 to steam traps which include drains of different sizes may be carried out as described above, by selecting the busing 90 (and its corresponding gasket 92) having the outer diameter corresponding to the particular drain 22 into which the lower portion 34B is to be inserted. Moreover, the kit may include a plurality of coil springs 94 having different relaxed lengths. The coil springs 94 of the appropriate length may then be selected depending upon the separation between the upper wall 86 of the chamber-defining member 16 and the upper end of the body 34, as described above in regard to the method for retrofitting the device 10.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A steam restricter device adapted to be retrofitted to an existing steam trap of the type comprising a chamber-defining member with an inlet for admitting steam and condensate into the chamber and a drain for draining condensate from the chamber to a condensate return, the device comprising, a body including an upper portion with an intake therein and an unthreaded lower portion with an outlet therein, the lower portion being generally sized for sliding into and out of the drain, a passage extending through the body from the intake to the outlet, the passage including a nozzle configured to permit passage of condensate but to inhibit passage of steam, means for holding the lower portion of the body in the drain, said holding means comprising biasing means adapted to engage a wall of the chamber-defining member and resiliently urge the lower portion of the body into the drain, sealing means on the lower portion of the body for making a seal with the drain when the lower portion is inserted therein such that substantially all communication from the chamber to the condensate return is blocked except through the nozzle in the body, and filter means enclosing the intake.

2. A steam restricter device as set forth in claim 1 wherein the upper portion has a larger cross section when the lower portion of the body, with a shoulder at the junction of the upper and lower portions.

3. A steam restricter device as set forth in claim 2 wherein said sealing means comprises an annular gasket adapted to be fitted over the lower portion of the body, the gasket being adapted to engage a portion of the chamber-defining member surrounding the drain and the restricter device body to establish a seal between the restricter device body and the chamber-defining member.

4. A steam restricter device as set forth in claim 3 wherein the sealing means further comprises a generally tubular bushing adapted to fit around the lower portion of the body and to sealingly engage a wall in the drain, the bushing including a radially outwardly projecting flange at its upper end.

5. A steam restricter device adapted to be retrofitted to an existing steam trap of the type comprising a chamber-defining member with an inlet for admitting steam and condensate into the chamber and a drain for draining condensate from the chamber to a condensate return, the device comprising, a body including an upper portion with an intake therein and an unthreaded lower portion with an outlet therein, the lower portion being generally sized for sliding into and out of the drain, a passage extending through the body from the intake to the outlet, the passage including a nozzle configured to permit passage of condensate but to inhibit passage of steam, means for holding the lower portion of the body in the drain, sealing means on the lower portion of the body for making a seal with the drain when the lower portion is inserted therein such that substantially all communication from the chamber to the condensate return is blocked except through the nozzle in the body, and filter means enclosing the intake, said filter means comprising a filter cage including an upper wall, a lower wall spaced apart from the upper wall and a tubular side wall extending between the upper and lower walls, the upper wall having an opening therein large enough to receive the upper portion of the body therein, the lower wall having an opening therein smaller than the upper portion of the body, but large enough to receive the lower portion therein so that filter cage can be removably assembled with the body by sliding the filter cage over the body from the bottom end of the body with the lower portion of the body first passing through the opening in the upper wall and then through the opening in the lower wall, the upper portion of the body being received in the opening in the upper wall with the shoulder engaging the lower wall.

6. A steam restricter device as set forth in claim 5 wherein the body further comprises a sealing member projecting from the upper portion of the body and adapted to engage the upper wall of the filter cage for sealing between the body and the filter cage.

7. A steam restricter device adapted to be retrofitted to an existing steam trap of the type comprising a chamber-defining member with an inlet for admitting steam and condensate into the chamber and a drain for draining condensate from the chamber to a condensate return, the device comprising, a body including an upper portion with an intake therein and an unthreaded lower portion with an outlet therein, the lower portion being generally sized for sliding into and out of the drain, a passage extending through the body from the intake to the outlet, the passage including a nozzle configured to permit passage of condensate but to inhibit passage of steam, means for holding the lower portion of the body in the drain, sealing means on the lower portion of the body for making a seal with the drain when the lower portion is inserted therein such that substantially all communication from the chamber to the condensate return is blocked except through the nozzle in the body, and filter means enclosing the intake, said filter means being located intermediate the top and bottom ends of the body.

8. A method for retrofitting an existing steam trap with a steam restricter device having a nozzle formed therein sized to permit passage of condensate, but inhibit passage of steam therethrough, the steam trap including a chamber-defining member having an inlet therein for admitting steam and condensate into the chamber and a drain for passage of condensate from the chamber to a condensate return, the chamber-defining member including a cover removably attached to the remainder of the member, the lower surface of the cover defining an upper wall of the chamber-defining member when the cover is attached thereto, and a stop member adapted to block and open the drain, the method comprising the steps of, removing the cover from the chamber-defining member, and sliding a lower portion of the steam restricter device downwardly into the drain in the chamber-defining member thereby blocking communication from the chamber to the condensate return except through the nozzle of the steam restricter device.

9. The method of claim 8 further comprising the step prior to said step of sliding the lower portion of the steam restricter into the drain of fitting an annular gasket over the lower portion of the steam restricter.

10. The method of claim 8 further comprising the step of removing the stop member from the steam trap.

11. The method of claim 8 further comprising the step of releasably securing the steam restricter device in the drain.

12. The method of claim 11 wherein said securing step comprises the step of placing biasing means in said chamber-defining member engageable with the upper wall of the chamber-defining member and with the steam restricter device to resiliently urge the lower portion of the device into the drain.

13. The method of claim 11 wherein said securing step comprises the steps of, providing a plurality of coil compression springs having different relaxed lengths, selecting a spring having a relaxed length correspondingly greater than the separation between the upper wall of the chamber-defining member and the upper portion of the body, and placing said spring in the chamber between the upper wall of the chamber-defining member and the upper portion of the body, the spring being held in compression suck that it exerts a force holding the lower portion of the body in the drain.

14. The method of claim 10 further comprising the steps prior to sliding the lower portion into the drain of, providing a plurality of tubular bushings having inner diameters corresponding to the outer diameter of the lower portion of the restricter device and outer diameters of different sizes, selecting one of the bushings having an outer diameter corresponding to the diameter of the drain, and fitting the bushing around the lower portion.

15. A kit for retrofitting a nozzle-type steam restricter device in any of a plurality of existing steam traps each including a chamber-defining member having an inlet thereon for admitting steam and condensate into the chamber and a drain for passage of the condensate from the chamber to a condensate return, the kit comprising, a body including an upper portion with an intake therein and a lower portion with an outlet therein, the lower portion being adapted for reception in the drain, a passage extending through the body from the intake to the outlet, the passage including a nozzle configured to permit passage of condensate but to inhibit passage of steam, a plurality of coil compression springs having different relaxed lengths, at least one of said springs having a relaxed length which is sufficiently greater than the separation of an upper wall of the chamber-defining member and the upper portion of the body such that placement of the spring between the upper wall of the chamber-defining member and the upper portion of the device places the spring in compression so that it exerts a biasing force urging the lower portion of the steam restricter device into the drain, and a filter cage received over the body for preventing debris from clogging the nozzle.

16. A kit as set forth in claim 15 further comprising a plurality of tubular bushings having inner diameters corresponding to the outer diameter of the lower portion of the steam restricter body, and outer diameters corresponding to the diameter of a particular drain.

17. The method of claim 8 further comprising prior to the step of sliding the lower portion of the steam restricter into the drain, of fitting a tubular bushing over the lower portion of the steam restricter.

* * * * *